United States Patent [19]

Jopp

[11] 4,040,952

[45] Aug. 9, 1977

[54] TRAVELING BAND SCREEN

[75] Inventor: Wolfgang Jopp, Niederneisen, Germany

[73] Assignee: Passavant-Werke Michelbacher Hutte, Aarbergen, Germany

[21] Appl. No.: 637,748

[22] Filed: Dec. 4, 1975

[30] Foreign Application Priority Data

Feb. 26, 1975 Germany .............................. 2508352

[51] Int. Cl.² ............................................. B01D 33/04
[52] U.S. Cl. .................................. 210/400; 198/848; 210/160
[58] Field of Search ......... 210/400, 401, 160, DIG. 3; 55/351, 353, 354; 209/307; 198/193, 194

[56] References Cited

U.S. PATENT DOCUMENTS

| 1,799,299 | 4/1931 | Johnston | 210/400 |
| 1,873,865 | 8/1932 | Allsop | 198/194 |
| 3,327,839 | 6/1967 | Sigety et al. | 198/193 X |
| 3,458,046 | 7/1969 | Passavant | 210/400 X |
| 3,537,571 | 11/1970 | Wiese | 198/193 |
| 3,608,727 | 9/1971 | Grutsch et al. | 210/400 X |
| 3,802,565 | 4/1974 | Hughes et al. | 210/160 |
| 3,848,731 | 11/1974 | Wiese et al. | 198/193 |

Primary Examiner—Frank W. Lutter
Assistant Examiner—William A. Cuchlinski, Jr.
Attorney, Agent, or Firm—Woodford R. Thompson, Jr.

[57] ABSTRACT

An endless traveling band screen formed of a plurality of screening elements is carried by endless, impermeable, flexible drive belts which extend along opposite sides of the traveling band screen adjacent the ends of the screening elements. The belts travel around upper and lower rotary members with sealing means interposed between adjacent screening elements, between the screening elements and the belts, and between the belts and adjacent walls of the screening unit.

7 Claims, 7 Drawing Figures

U.S. Patent  Aug. 9, 1977  Sheet 1 of 2  4,040,952
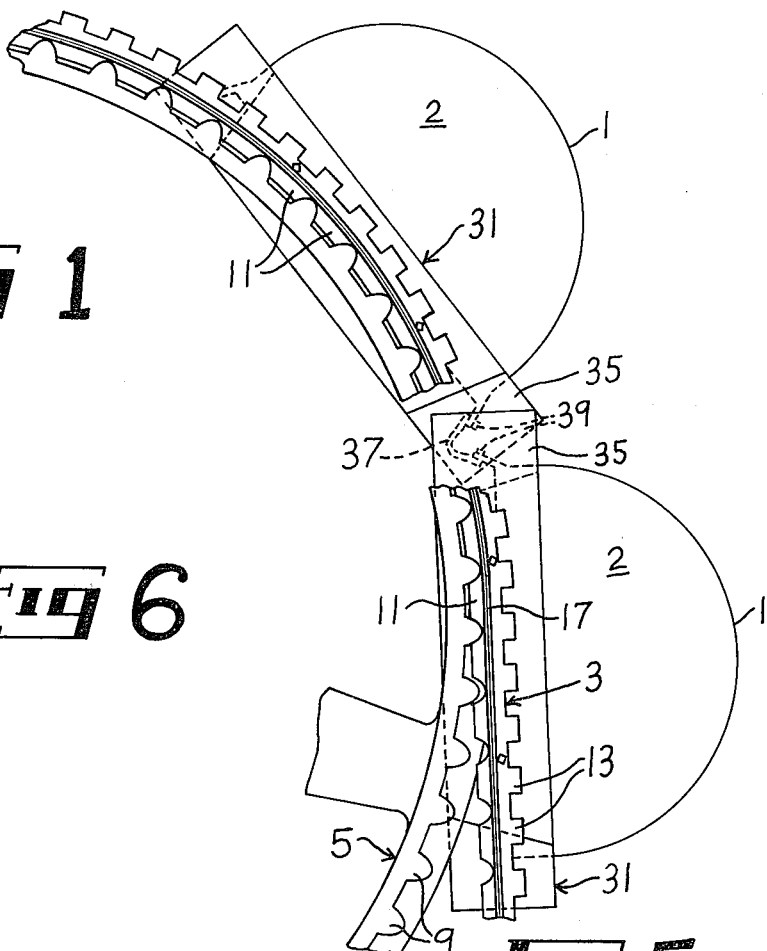
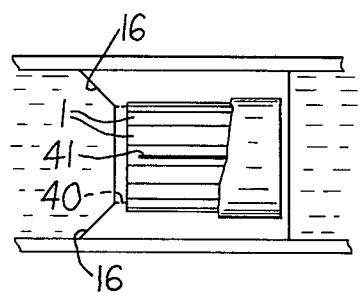
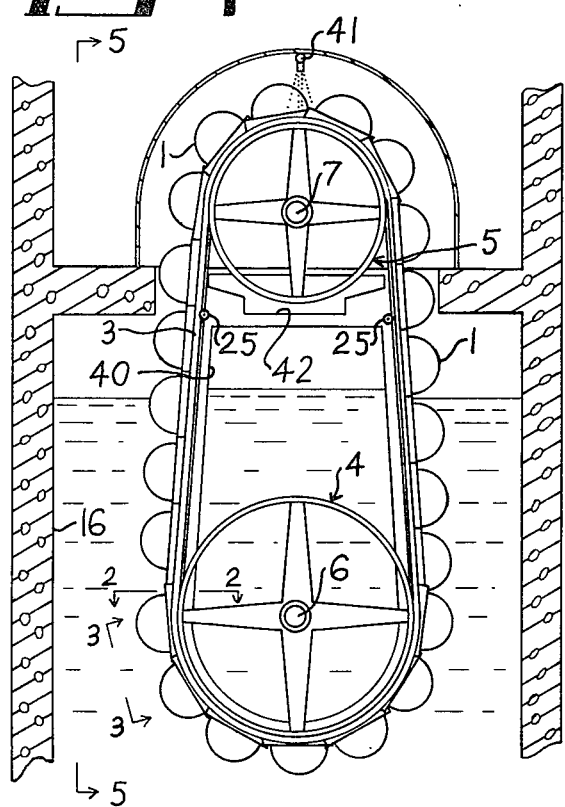
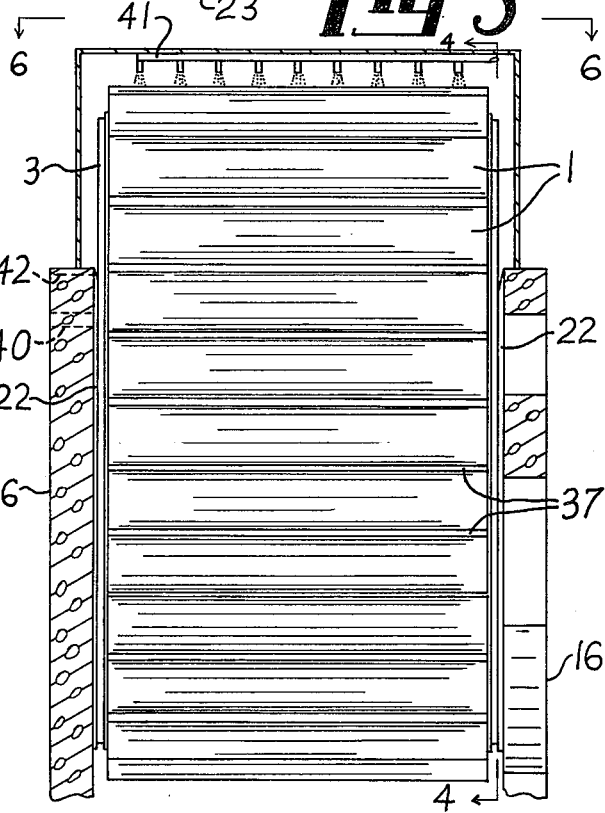

TRAVELING BAND SCREEN

BACKGROUND OF THE INVENTION

This invention relates to a traveling band screen formed of a plurality of screening elements which are attached at their ends to endless drive belts which travel around upper and lower rotary members.

In prior art screening equipment of this type the traction means usually comprises sprocket chains carrying screening elements which are pivotally attached thereto and spaced apart by several chains links. The screening elements are either of the flat type or of the basket type having a semi-cylindrical shape to increase the area of the screening surface. Since the sprocket chains are pervious to water the chain links and hinge means for the screening elements are continually subjected to the corrosive action of the liquid being screened, such as waste water. A further and even greater drawback to prior art equipment is the fact that the traction means permits leaks through which untreated liquid may by-pass the screening elements either between the screen band and the adjacent wall of the unit or between adjacent screening elements whereby this liquid will be discharged from the unit without prior treatment.

SUMMARY OF THE INVENTION

In accordance with my invention I prevent the leakage of untreated liquid past the screening elements of the traveling band screen by providing traveling traction means such as endless, watertight, flexible belts or band. The belts consisting of flexible material are also capable of sealingly engaging adjacent surfaces of structural members, such as walls of the screening unit, thereby preventing leakage in such area. The use of flexible belts also eliminates the necessity of providing links and hinges whereby corrosion and wear are reduced to a minimum. Furthermore, the means connecting the screening elements may be embedded in waterproof material of the belt so as to be protected from the corrosive action of the liquid being treated.

DESCRIPTION OF THE DRAWINGS

Apparatus embodying features of my invention is illustrated in the accompanying drawings, forming a part of this application, in which:

FIG. 1 is a fragmental, side elevational view of the upper end of a traveling band screen as seen from the ends of the screening elements;

FIG. 4 is a side elevational view drawn to a smaller scale as seen from the ends of the screening elements and taken generally along the line 4—of FIG. 5;

FIG. 5 is a side elevational view taken generally along the line 5—5 of FIG. 4;

FIG. 6 is a top plan view, drawn to a smaller scale, taken generally along the line 6—6 of FIG. 5; and, FIG. 7 is a fragmental view showing one of the guide rollers for the band screen.

DETAILED DESCRIPTION

Figure 2:
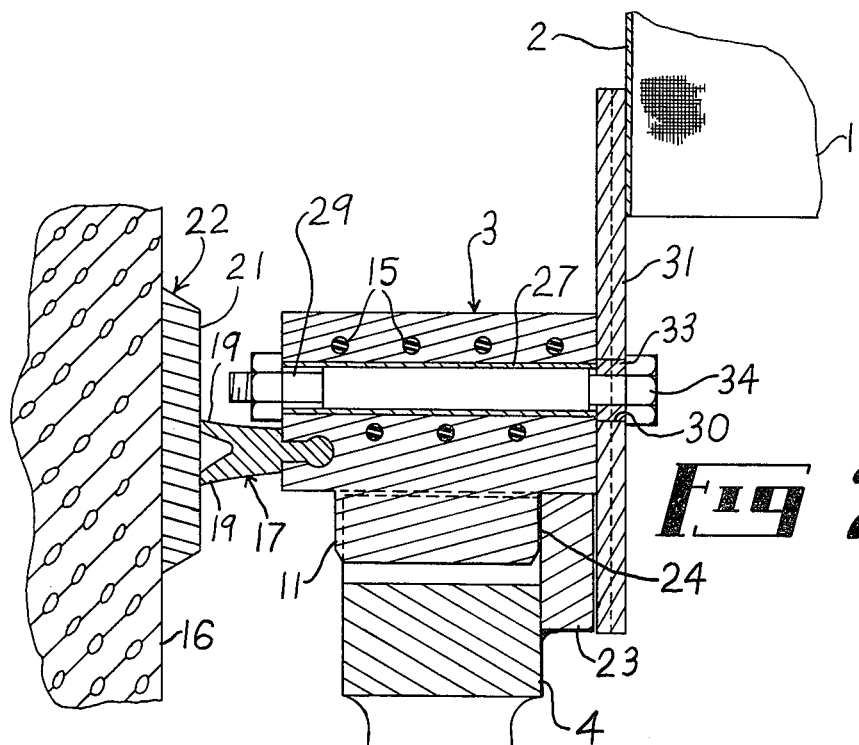
FIG. 2 is an enlarged, fragmental sectional view taken generally along the line 2—2 of FIG. 4.

Referring now to the drawings for a better understanding of my invention, I show my improved screening apparatus as comprising a traveling band screen formed of a plurality of screening elements 1 of the semicylindrical basket type which are open on the inside, as shown in FIG. 2. The outer surface of each screening element 1 is covered with a suitable screen fabric and the ends thereof are closed by end members 2. To form the traveling band screen, each end of each screening element 1 is secured to and moves with an endless, impermeable, flexible belt 3 having teeth 11 on the inner surface thereof.

The belt 3 is trained around lower and upper rotary members 4 and 5, respectively, which may be in the form of spoked wheels supported on shafts 6 and 7, respectively. Each rotary member 4 and 5 is provided with external teeth 9 which cooperate with the teeth 11 on the inner surface of the belt 3. Preferably, the upper shaft 7 is driven by suitable means, not shown, whereby the belts 3 are driven through positive engagement of the teeth 9 and 11. As shown in FIG. 4, the lower rotary member 4 is usually slightly larger than the upper rotary member 5 and is not driven. The teeth 11 are formed by providing indentations in the inner surface of the belts 3, as shown, to increase flexibility of the belts. Preferably, similar indentations are also provided in the outer surface of each belt 3 to provide spaced apart teeth 13 which further increases flexibility of the belt.

Figure 3:
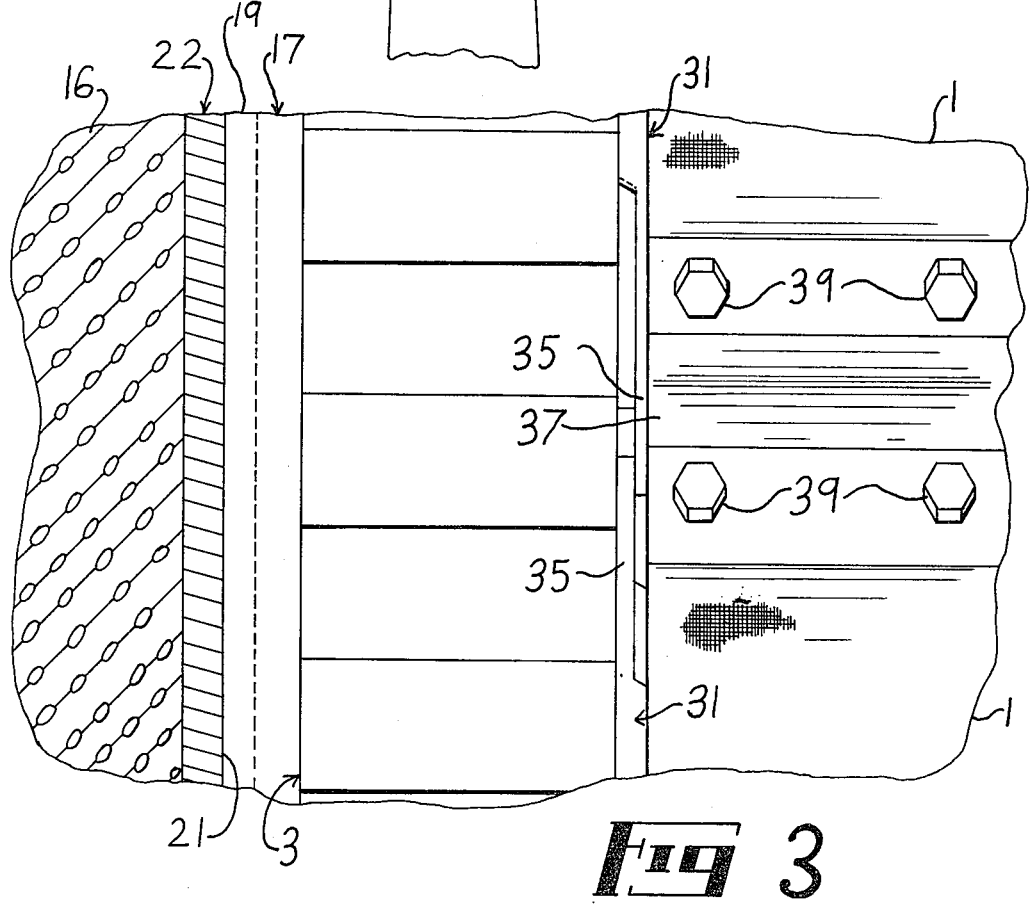
FIG. 3 is an enlarged, fragmental sectional view taken generally along the line 3—3 of FIG. 4.

To reduce extensibility of the belts 3, tension resistant inserts, such as wire strands 15 or plastic materials, are embedded in the belts 3, as shown in FIG. 2. Also, the toothed belts 3 are formed of a suitable flexible, corrosion resistant material, such as rubber or plastic and are spaced from the adjacent wall structure 16 of the screening unit, as shown in FIGS. 2 and 3. Usually, the adjacent wall structure 16 is formed of concrete.

The space between the wall 16 of the screening unit and each belt 3 is bridged by a laterally projecting, endless sealing member 17 carried by the outer edge of the belt 3, as shown in FIGS. 2 and 3. The sealing member 17 is formed of a soft material, such as rubber, perlon fabric or the like, and is provided with sealing edges or lips 19 which slidably engage a sealing surface 21 on a member 22 carried by the adjacent wall 16. The sealing member 17 may be an integral part of the belt 3; however, being subject to wear the sealing member should preferably be detachably connected to the belt 3. The contact surface 21 defines an endless path corresponding to the path of the belts 3 of the screening unit and is formed of a suitable low-friction, low-wear material, such as a polyester plastic or the like, so as to provide a smooth surface. As shown in FIG. 2, the sealing member 17 is slightly prestressed while it is engaging the contact surface 21 whereby its elastic edges or lips 19 are capable of compensating for any irregularities of the surface 21.

To provide substantially uniform prestressing of the sealing member 17 and to reduce lateral deviations of each belt 3 transversely of the direction of travel, each rotary member 4 and 5 carries a laterally disposed rim 23 which engages a shoulder 24 defined by a slightly narrower toothed edge 11 of the belt 3, as shown in FIG. 2. The rim 23 thus provides a guide for the belt 3. To further improve the alignment of the toothed belts 3, by limiting lateral movement thereof, suitable flanged guide rollers 25 are mounted at spaced intervals intermediate the rotary members 4 and 5 in position to engage each belt 3.

As show in FIG. 2, transverse bearing sleeves 27 are embedded in and vulcanized to each toothed belt 3 for receiving bolts 29. The bolts 29 pass through suitable openings 30 provided in side frame members 31 which are secured to each end of each screen element 1. The bolts 29 thus connect the frame members 31 of each screen element to the toothed belts 3. A suitable collar 33 is mounted in opening 30 and surrounds the bolt 29 adjacent the bolt head 34 to permit pivotal movement of the side frame members 31 relative to the belts 3. Each bolt 29 is mounted within its sleeve 27 with sufficient radial tolerance so as to provide a loose fit which compensates for small variations in distance between the pivotal connecting points of the screening elements 1, which occurs as each belt 3 passes through curved and straight sections of its path of travel. Such variations would otherwise cause undue tensile stress.

As shown in FIGS. 1 and 3 the side frame members 31 of adjacent screening elements have end portions 35 which project toward each other and overlap each other in the direction of rotation. As shown in FIG. 3, the end portions 35 are one-half the thickness of the remaining portions of the side frame members 31 whereby there is a uniform thickness of each side frame member 31 throughout its path of travel. Due to this construction the relative movement of the screening elements 1 will not impair the sealing contact between the overlapped portions of the side frame members 31 and between the side frame members 31 and the toothed belts 3.

Extending between adjacent screening elements 1 are flexible sealing strips 37 which are secured in place along their longitudinal edges by suitable clamping means 39. The sealing strips 37 thus sealingly bridge the gap between adjacent screening elements 1. The lateral edges of each sealing strip 37 engage the adjacent belt 3 or the side frame members 31 with a close sliding fit so as to prevent leakage therebetween. As shown in FIG. 1, each sealing strip 37 is wider than the gap between adjacent screening elements 1 so that it sags in an arch-like fashion. Due to its flexibility or resilience the sealing strip 37 will absorb relative movements and changes in distance between the screening elements 1.

From the foregoing description the operation of my improved apparatus will be readily understood. As the traveling band rotates, the screening elements 1 successively plunge into the water to be processed thus forming an interface between the polluted or untreated water and the treated or clean water, with the water passing from inside out or vice versa. In the drawings I show the water as passing into the traveling band screen unit through an inlet passageway 40 whereby the water flows from inside out. The debris settling on the inside of the screen fabric is removed by suitable spray apparatus 41 after the screening elements 1 emerge from the water so that the screening elements are cleaned prior to reimmerging. The debris removed by the spray apparatus 41 is removed by suitable discharge means indicated generally at 42.

From the foregoing it will be seen that my improved apparatus provides complete sealing around the individual screening elements 1 and between the traveling belts and the adjacent walls of the screening unit. Also, corrosion and wear are greatly reduced since the component most likely to wear is the sealing member 17 which may be easily removed and replaced by a new sealing member.

While I have shown my invention in one form, obvious modifications and variations may be made from the above teachings. For example, the sealing member 17 may assume various shapes and may be made from various materials. Also, the sealing strips 37 may engage the toothed belts 3 directly or may be sealingly connected therewith.

What I claim is:

1. In a screening unit embodying an endless traveling band screen formed of a plurality of screening elements,
   a. an endless, impermeable, flexible belt extending alongside each side of said traveling band screen adjacent the ends of said screening elements,
   b. upper and lower rotary members around which the endless belts pass,
   c. means operatively connecting each end of each said screening element to the belt adjacent thereto, and
   d. a laterally projecting endless sealing member carried by each said belt in position to sealingly engage an adjacent wall of the screen unit.

2. Apparatus as defined in claim 1 in which said sealing member is in the form of a resilient lip.

3. Apparatus as defined in claim 1 in which said sealing member is detachably connected to said belt.

4. Apparatus as defined in claim 1 in which the portion of said wall that is engaged by said sealing member carries a contact surface of low-friction, low wear material.

5. Apparatus as defined in claim 1 in which a plurality of bearing sleeves as embedded in and secured to said belt and receive fastening bolts which connect said screening elements to said belt.

6. Apparatus as defined in claim 5 in which said fastening bolts fit within said bearing sleeves with a loose fit to provide the necessary radial clearance to compensate for variations in distance between adjacent fastening bolts.

7. Apparatus as defined in claim 1 in which said rotary members carry annular rims which engage said belt and limit lateral movement of said belt relative to said rotary members.

* * * * *